United States Patent [19]

Tamura et al.

[11] Patent Number: 4,493,674
[45] Date of Patent: Jan. 15, 1985

[54] VIBRATION DAMPER ASSEMBLY

[75] Inventors: Kazuhisa Tamura, Hirakata; Masahiko Koshimo, Higashi-Osaka, both of Japan

[73] Assignee: Kabushiki Kaisha Daikin Seisakusho, Osaka, Japan

[21] Appl. No.: 421,338

[22] Filed: Sep. 22, 1982

[30] Foreign Application Priority Data

Jan. 27, 1982 [JP] Japan .............................. 57-10387[U]

[51] Int. Cl.$^3$ .............................................. F16D 3/14
[52] U.S. Cl. ..................................... 464/68; 192/106.2
[58] Field of Search .............. 192/70.17, 70.18, 106.1, 192/106.2; 464/66, 68, 81, 85

[56] References Cited

U.S. PATENT DOCUMENTS

| | | | |
|---|---|---|---|
| 2,636,363 | 4/1953 | Nutt | 464/68 |
| 3,138,011 | 6/1964 | Stromberg | 464/68 X |
| 4,156,481 | 3/1979 | Ishida et al. | 192/106.1 |
| 4,197,931 | 4/1980 | Norcia | 464/68 X |
| 4,223,776 | 9/1980 | Berlioux | 192/106.2 |
| 4,302,951 | 12/1981 | Fall et al. | 464/66 |
| 4,304,107 | 12/1981 | Fall et al. | 464/81 X |
| 4,347,717 | 9/1982 | Lamarche | 192/106.2 X |
| 4,398,625 | 8/1983 | Beccaris | 464/68 X |
| 4,413,711 | 11/1983 | Lamarche | 192/106.2 X |

FOREIGN PATENT DOCUMENTS

| | | | |
|---|---|---|---|
| 2304699 | 8/1973 | Fed. Rep. of Germany | 192/106.2 |
| 750498 | 8/1933 | France | 464/66 |

Primary Examiner—Stuart S. Levy
Assistant Examiner—Daniel P. Stodola
Attorney, Agent, or Firm—Armstrong, Nikaido, Marmelstein & Kubovcik

[57] ABSTRACT

A vibration damper assembly which includes an output hub with circumferentially spaced plural radial arms and arcuate openings between the arms; input covers disposed at both sides of the hub and having openings axially faced to the openings in the hub; plural torsion springs arranged circumferentially tandem in each set of the openings in the hub and the covers; and floating spacers arranged between the torsion springs and circumferentially slidably supported by rail portions forming outer and inner edges of the opening in the hub. The floating spacers are made of a middle slider having a pair of end plates riveted thereto over lapping the rail portions.

5 Claims, 4 Drawing Figures

VIBRATION DAMPER ASSEMBLY

BACKGROUND OF THE INVENTION

The present invention relates to a vibration damper assembly which is employed in driving mechanisms such as a clutch for a manual transmission, a torque converter for an automobile having a lockup-clutch for direct driving, or the like.

Such a vibration damper assembly has already been developed that employs plural coil springs aligned circumferentially tandem with floating spacers therebetween for acquiring a large torsion angle. However, the known floating spacers are guided directly by a damper cover or the like and are circumferentially movable on the cover. Therefore, the floating spacers may jolt during the circumferential movement, or can not smoothly move, which applies an unbalanced load to the springs and deforms the springs. In order to avoid the above problems, the floating spacers may be fixed to or integrally formed by press-fitting with annular spacer supports which are arranged at both sides of an output hub. However, this structure has such disadvantages that the vibration damper assembly has a long axial size and is hard to assemble in a narrow space in a torque converter, because the spacer supports are arranged axially on both sides of the output hub.

Accordingly, it is an object of the invention to provide an improved vibration damper assembly, overcoming the above-noted disadvantages.

The essence of the invention is to provide floating spacers which are movably supported by radially inner and outer edges of openings formed in an output hub.

Other and further objects, features and advantages of the invention will appear more fully from the following description of the preferred embodiments of the invention.

DETAILED DESCRIPTION OF THE PREFERRED EMBODIMENTS

Figure 1:
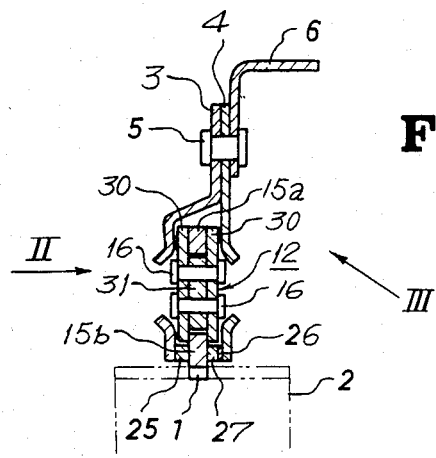
FIG. 1 is a longitudinal partial sectional view of a vibration damper assembly of an embodiment according to the invention.
Figure 2:
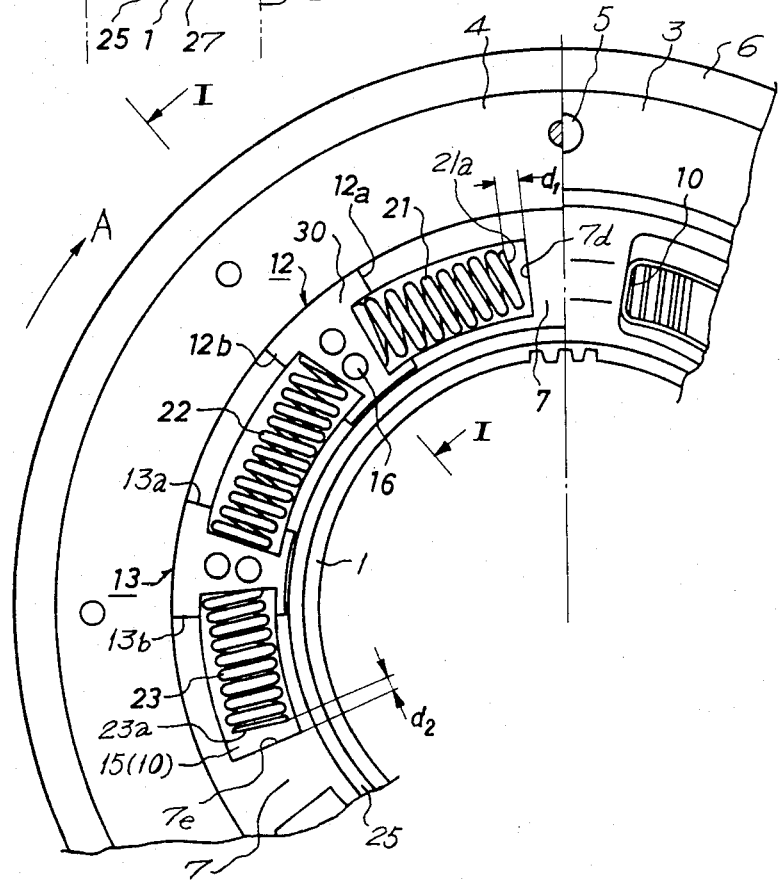
FIG. 2 is a partially cut-away plane view viewed in a direction of an arrow II of FIG. 1.

Referring to FIG. 1, which is a partial sectional view taken along line I—I in FIG. 2, an inner periphery of an annular output hub 1 is splined to an output shaft 2. A main cover 3 and a sub-cover 4 are arranged at both sides of the hub 1 with spaces therebetween. Both covers 3 and 4 and a drive plate 6 are fixed together by rivets 5. The drive plate 6 is connected to, e.g., a flywheel of an engine. A friction facing may be fixed to the cover 4 instead of the plate 6. In this structure including the friction facing, the vibration damper assembly is used as a clutch disc, and the covers 4 and 3 form a clutch plate and a retaining plate, respectively.

Referring to FIG. 2, the hub 1 is provided with three arms 7 which respectively extend radially outwardly and are circumferentially equally spaced. The covers 3 and 4 are provided with openings 10 faced to circumferential spaces or openings 15 between the arms 7. Three compressible coil springs 21, 22 and 23, which are aligned circumferentially tandem, are arranged and compressed in each pair of the openings 10. With respect to a rotation direction A, the springs 21, 22 and 23 are positioned at front, middle and rear, respectively. A floating spacer 12 is arranged between the springs 21 and 22. A floating spacer 13 is arranged between the springs 22 and 23.

Figure 3:
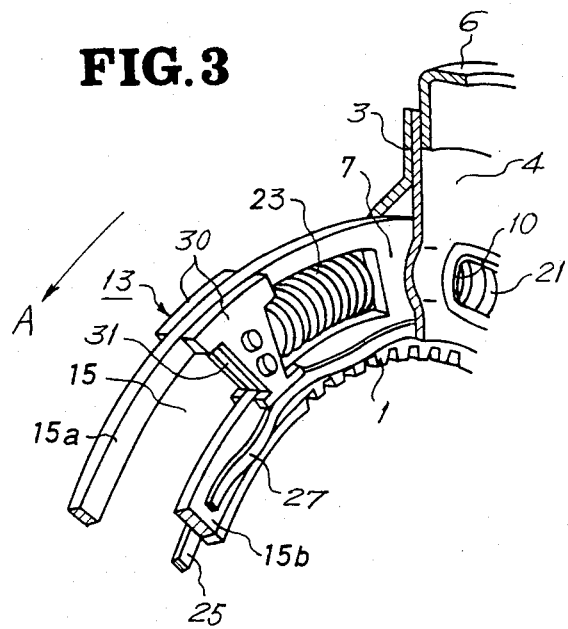
FIG. 3 is a partially cut-away perspective view viewed in a direction of an arrow III of FIG. 1.
Figure 4:
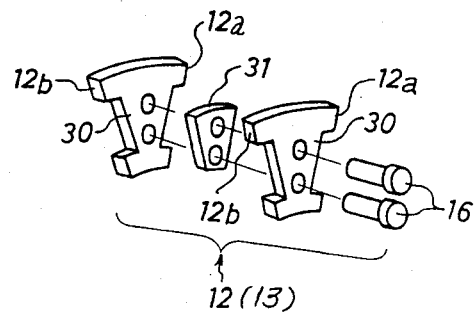
FIG. 4 is a schematic perspective view of a floating spacer in disassembly of an embodiment according to the invention.

Referring to FIG. 4, each of the floating spacers 12 and 13 includes a pair of substantially H-shaped end plates 30 fixed to both sides of a slider 31 by rivets 16. A radial length of the slider 31 is shorter than that of each end plate 30, whereby, grooves are formed radially inside and outside the slider 31. As shown in FIG. 3, these grooves engage with rail portions 15a and 15b which form the outer and inner edges of the opening 15, respectively. As shown in FIG. 2, the floating spacer 12 is provided at its radially outer portion with stoppers 12a and 12b projecting in the rotation direction A and the reverse direction, respectively. The floating spacer 13 is also provided at its radially outer portion with stoppers 13a and 13b projecting in the rotation direction A and the reverse direction, respectively. These stoppers 12a, 12b, 13a and 13b are integrally formed in the end plates 30.

The hub arms 7 and the floating spacers 12 and 13 are aligned in a common plane including center lines of the coil springs 21, 22 and 23. In the illustrated position, in which the covers 3 and 4 do not torsionally turn with respect to the hub 1, a front end face 21a of the spring 21 is apart from a rear edge face 7d of the adjacent arm 7 with a space d1 therebetween and is supported by edges of the openings 10. In the illustrated position, a rear end face 23a of each spring 23 is apart from a front edge face 7e of the adjacent arm 7 with a space d2 therebetween and is supported by edges of the openings 10.

Referring to FIG. 1, an annular frictional member 25 is disposed between the hub 1 and the main cover 3. An annular frictional member 26 and a wave spring 27 are disposed between the hub 1 and the sub-cover 4.

One of the specific functions or operations of the assembly can be as follows. In FIG. 2, when the drive plate 6 starts to rotate in the direction A, the covers 3 and 4 fixed to the plate 6 also start to rotate, and torsionally turn with respect to the hub 1. When the springs 21, 22 and 23 which are held in the openings 10 of the covers 3 and 4 torsionally travel the space d1 with respect to the hub 1, the front end faces 21a of the springs 21 contact with the rear edge faces 7d of the arms 7. Thereafter, the drive plate 6 further turns and the springs 21, 22 and 23 are compressed, and thus, a rotational force is transmitted from the drive plate 6 to the hub 1 through the covers 3 and 4 and the springs 21, 22 and 23. Initially in this compression operation, the springs 22 are compressed more than the springs 21 and 23, because the springs 22 are softer than the springs 21 and 23. When the drive plate 6 receives a rotational force in the reverse direction, the springs 21, 22 and 23 start to be compressed, after the drive plate 6 torsionally travels the space d2 with respect to the hub 1. The reverse force is also transmitted to hub 1 through the above-noted members. When the covers 3 and 4 torsionally travel with respect to the hub 1, friction occurs on the frictional members 25 and 26, which causes a hysteresis in force and torsion angle characteristic.

According to the invention, as stated hereinbefore, the hub 1 is provided with radial arms 7, and the arcuate openings 15, in which the springs 21, 22 and 23 are arranged, are formed between the arms 7. The floating spacers 12 and 13 arranged between the springs 21, 22 and 23 are circumferentially slidably supported on the rail portions 15a and 15b forming the outer and inner edges of the hub openings 15. Therefore, centrifugal force applied to the spacers 12 and 13 can be supported by the rail portion 15a of the hub 1. Thus, it is not necessary to provide the covers 3 and 4 with highly precise guide surfaces for the spacers 12 and 13. Further, the floating spacers 12 and 13 can smoothly travel in the circumferential direction without unpreferably play. The springs 21, 22 and 23 do not receive a unbalanced load. Since the spacers 12 and 13 are supported by the hub 1, it is not necessary to provide an extra member for positioning and supporting the spacers 12 and 13, which reduces a number of the parts and cost. Even in the assembly of the illustrated type, in which radially positioning precision between the hub 1 and the covers 3 and 4 can not be kept high, the spacers 12 and 13 can precisely circumferentially travel without being radially supported by the covers 3 and 4, thus, the operation of the spacers 12 and 13 can be stable independently of the radial deviation.

In a modification of the invention, rubber elastic members can be employed as the torsion springs instead of some or all of the coil springs 21, 22 and 23.

The stoppers 12a, 12b, 13a and 13b may have such circumferential lengthes that the springs may be prevented from being fully compressed.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed:

1. A vibration damper assembly comprising an output hub having circumferentially spaced plural radial arms and arcuate openings between the arms; input covers disposed at both sides of the hub and having openings axially faced to the openings in the hub defining sets of openings; plural torsion springs arranged circumferentially tandem in each set of the openings in the hub and the covers; and floating spacers arranged between the torsion springs and circumferentially slidably supported by rail portions formed by radially outer and inner edges of the openings in the hub, each said spacer having portions overlapping said inner and outer edges;

each of the floating spacers comprising a middle slider which is slidable and in contact with the rail portions forming radially outer and inner edges of the opening in the hub, and a pair of end plates fixed by a rivet to both face surfaces of the middle slider, said overlapping portions of each spacer being formed by portions of each end plate slidably holding the rail portions from both sides thereof.

2. A vibration damper assembly of claim 1 wherein three torsion springs are disposed in each opening in the hub, and two floating spacers are arranged between the three springs.

3. A vibration damper assembly of claim 1 wherein the torsion springs are consisted of compressible coil springs.

4. A vibration damper assembly of claim 1 wherein the floating spacers are provided with stoppers which are operable to circumferentially contact with each other.

5. A vibration damper assembly of claim 1 wherein compressed friction members are arranged between the output hub and the covers and a wave spring is arranged between one of the friction members and one of the covers.

* * * * *